United States Patent
Cao et al.

(10) Patent No.: US 8,705,956 B2
(45) Date of Patent: Apr. 22, 2014

(54) CARRIER FREQUENCY OFFSET (CFO) ESTIMATOR WITH LOW COMPLEXITY AND HIGH ACCURACY FOR ORTHOGONAL-FREQUENCY-DIVISION-MULTIPLEXING (CO-OFDM) SYSTEMS

(75) Inventors: Mingzheng Cao, Kearny, NJ (US); Dayou Qian, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 324 days.

(21) Appl. No.: 13/086,724

(22) Filed: Apr. 14, 2011

(65) Prior Publication Data
US 2011/0255864 A1    Oct. 20, 2011

Related U.S. Application Data
(60) Provisional application No. 61/324,109, filed on Apr. 14, 2010.

(51) Int. Cl.
H04B 17/00 (2006.01)
H04K 1/10 (2006.01)
H04B 1/707 (2011.01)
H04L 12/26 (2006.01)

(52) U.S. Cl.
USPC ............ 398/25; 398/9; 375/260; 375/316; 370/252; 370/203

(58) Field of Classification Search
USPC .................... 398/25, 9; 375/316, 260
See application file for complete search history.

(56) References Cited

PUBLICATIONS

Morelli ["Carrier Frequency Estimation for Transmissions over Selective Channels" IEEE Transactions on Communications vol. 48 No. 9 Sep. 2000].*
Morelli II ["An Improved Frequency Offset Estimator for OFDM Applications" IEEE Communications Letters vol. 3 No. 3 Mar. 1999].*
Ruan ["Approximated Maximum Likelihood Estimation of Carrier Frequency Offset in Practical OFDM Systems" IEEE WCNC Proceedings 2007].*
Moose, Paul H., "A Technique for Orthogonal Frequency Division Multiplexing Frequency Offset Correction", IEEE Transactions on Communications, vol. 42, No. 10, Oct. 1994, pp. 2908-2914.
Morelli, M. et al., "An Improved Frequency Offset Estimator for OFDM Applications", IEEE Communications Letters, vol. 3, No. 3, Mar. 1999, pp. 75-77.
Morelli, M. et al., "Carrier-Frequency Estimation for Transmissions over Selective Channels", IEEE Transactions on Communications, vol. 48, No. 9, Sep. 2000, pp. 1580-1589.
Schmidl, T. et al., "Robust Frequency and Timing Synchronization for OFDM", IEEE Transactions on Communications, vol. 45, No. 12, Dec. 1997, pp. 1613-1621.
Shieh, W. et al., "Coherent optical OFDM: has its time come? [Invited]", Journal of Optical Networking, vol. 7, No. 3, Mar. 2008, pp. 234-255.

* cited by examiner

Primary Examiner — Kenneth Vanderpuye
Assistant Examiner — Oommen Jacob
(74) Attorney, Agent, or Firm — Joseph Kolodka; James Bitetto

(57) ABSTRACT

A system and method are provided for carrier frequency offset (CFO) estimation for coherent optical orthogonal-frequency-division-multiplexing (CO-OFDM) broadband systems. The method includes obtaining an initial estimate of a normalized CFO with an estimation range equal to ±L/2 subcarrier subspacing using a single training symbol with L identical portions. The method further includes obtaining a maximum likelihood (ML) estimate of the CFO by performing a local grid search based on the initial estimate.

18 Claims, 5 Drawing Sheets

CARRIER FREQUENCY OFFSET (CFO) ESTIMATOR WITH LOW COMPLEXITY AND HIGH ACCURACY FOR ORTHOGONAL-FREQUENCY-DIVISION-MULTIPLEXING (CO-OFDM) SYSTEMS

RELATED APPLICATION INFORMATION

This application claims priority to provisional application Ser. No. 61/324,109 filed on Apr. 14, 2010, incorporated herein by reference.

BACKGROUND

1. Technical Field

The present invention relates to optical communications, and more particularly to a carrier frequency offset (CFO) estimator with low complexity and high accuracy for coherent optical orthogonal-frequency-division-multiplexing (CO-OFDM) systems.

2. Description of the Related Art

Coherent optical orthogonal-frequency-division-multiplexing (CO-OFDM) is proposed for high-rate transmissions due to its robustness to chromatic dispersion. However, OFDM is very sensitive to carrier frequency offset (CFO) caused by the instability of local oscillators (LO). Since CFO destroys the orthogonality among the subcarriers, CFO within even a small fraction nf the cnhearrier spacing degrades the hit error rate (BER) performance of OFDM receivers severely. Meanwhile, a simple CFO estimator with high accuracy is required in the CO-OFDM real-time system implementation.

In conventional CO-OFDM systems, a radio frequency (RF) tone is added next to the OFDM signal which can be filtered out to estimate the CFO. In other solutions, direct current (DC) components can also be filtered out to estimate the CFO. Both solutions require a small bandwidth band-pass filter which may not be efficient in high speed real-time implementations. Moreover, the additional RF tone increases the system complexity and the DC component may not always be available.

SUMMARY

These and other drawbacks and disadvantages of the prior art are addressed by the present principles, which are directed to a carrier frequency offset (CFO) estimator with low complexity and high accuracy for coherent optical orthogonal-frequency-division-multiplexing (CO-OFDM).

According to an aspect of the present principles, a method is provided for carrier frequency offset (CFO) estimation for coherent optical orthogonal-frequency-division-multiplexing (CO-OFDM) broadband systems. The method includes obtaining an initial estimate of a normalized CFO with an estimation range equal to ±L/2 subcarrier subspacing using a single training symbol with L identical portions. The method further includes obtaining a maximum likelihood (ML) estimate of the CFO by performing a local grid search based on the initial estimate.

According to another aspect of the present principles, a system is provided for carrier-frequency-offset (CFO) estimation for coherent optical orthogonal-frequency-division-multiplexing (CO-OFDM) broadband systems. The system includes an initial carrier frequency offset estimator for obtaining an initial estimate of a normalized CFO with an estimation range equal to ±L/2 subcarrier subspacing using a single training symbol with L identical portions. The system also includes a memory for storing the initial estimate. The system further includes a maximum likelihood estimator for obtaining a maximum likelihood (ML) estimate of the CFO by performing a local grid search based on the initial estimate.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
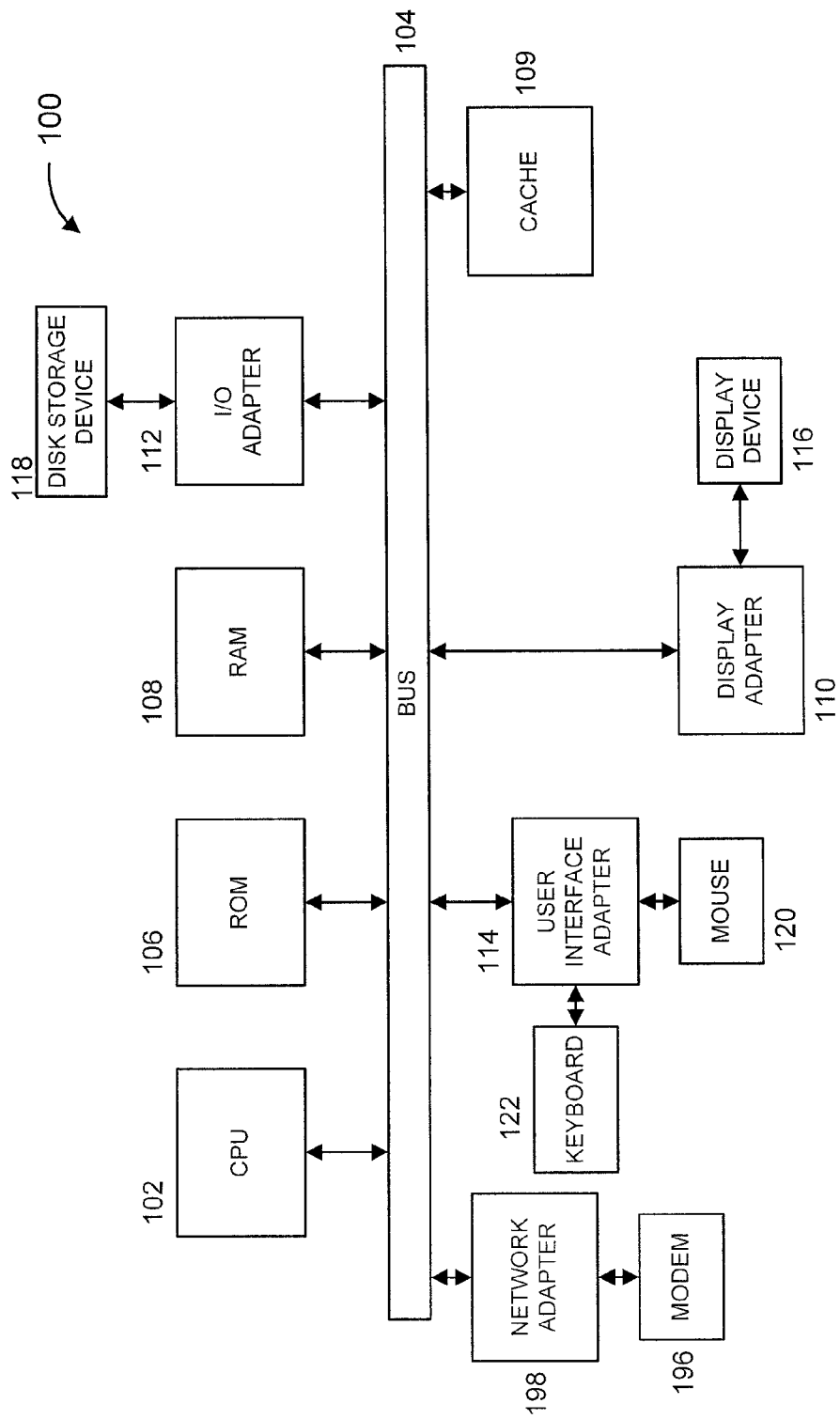
FIG. 1 is a block diagram illustrating an exemplary processing system 100 to which the present principles may be applied, according to an embodiment of the present principles.

Referring now in detail to the figures in which like numerals represent the same or similar elements and initially to FIG. 1, a block diagram illustrating an exemplary processing system 100 to which the present principles may be applied, according to an embodiment of the present principles, is shown. The processing system 100 includes at least one processor (CPU) 102 operatively coupled to other components via a system bus 104. A read only memory (ROM) 106, a random access memory (RAM) 108, a display adapter 110, an I/O adapter 112, a user interface adapter 114, and a network adapter 198, are operatively coupled to the system bus 104.

A display device 116 is operatively coupled to system bus 104 by display adapter 110. A disk storage device (e.g., a magnetic or optical disk storage device) 118 is operatively coupled to system bus 104 by I/O adapter 112.

A mouse 120 and keyboard 122 are operatively coupled to system bus 104 by user interface adapter 114. The mouse 120 and keyboard 122 are used to input and output information to and from system 100.

A (digital and/or analog) modem 196 is operatively coupled to system bus 104 by network adapter 198.

Of course, the processing system 100 may also include other elements (not shown), including, but not limited to, a sound adapter and corresponding speaker(s), and so forth, as readily contemplated by one of skill in the art.

Figure 2:
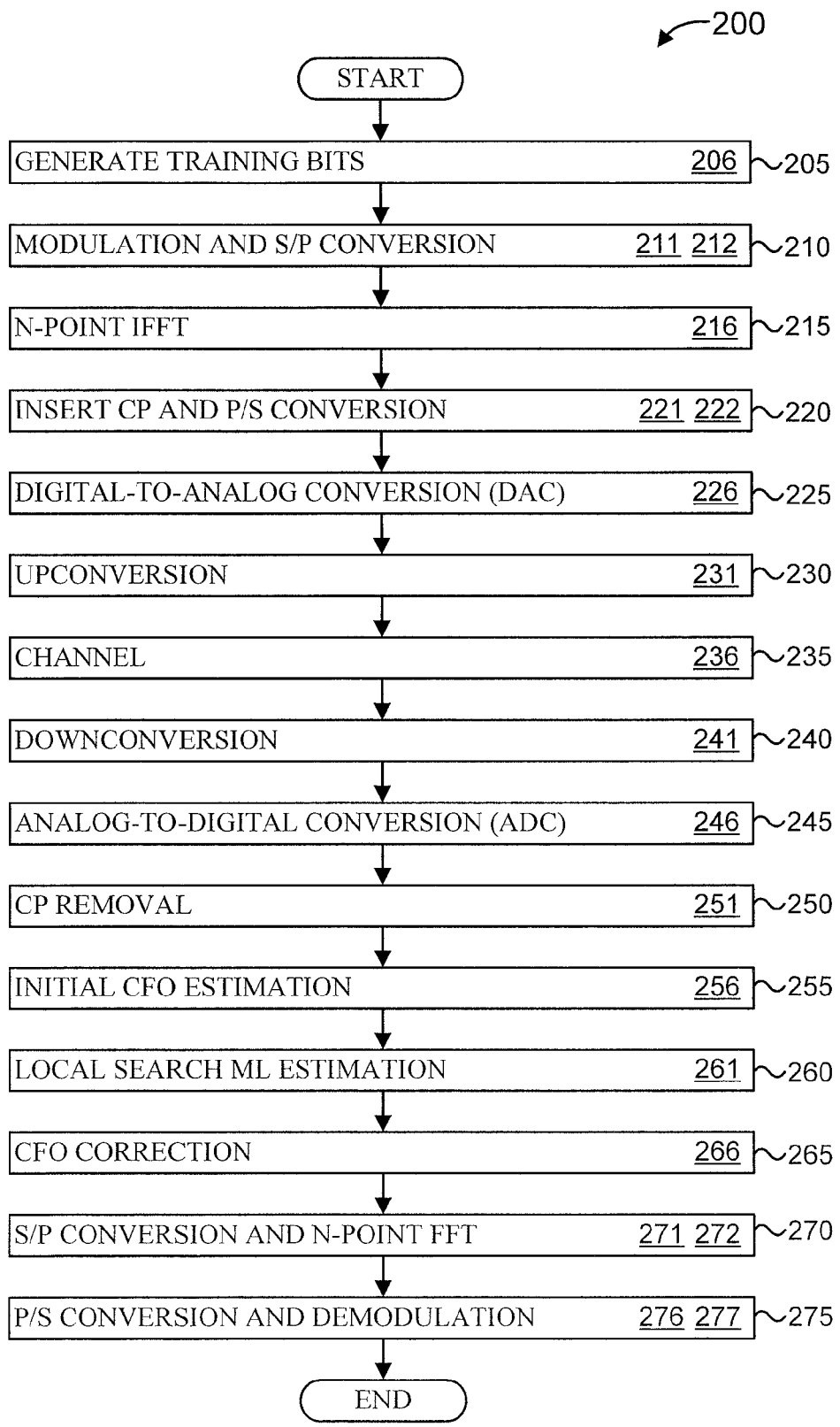
FIG. 2 is a high-level block diagram showing an exemplary method/system 200 for carrier frequency offset (CFO) estimation for coherent optical orthogonal-frequency-division-multiplexing (CO-OFDM) systems, according to an embodiment of the present principles.

FIG. 2 is a high-level block diagram showing an exemplary method/system 200 for carrier frequency offset (CFO) estimation for coherent optical orthogonal-frequency-divisionmultiplexing (CO-OFDM) systems, according to an embodiment of the present principles.

At step 205, training bits are generated by a training bit generator 206. Step 205 may involve, for example, generating time-domain training sequences s[n] with L identical parts, applying an N-point fast Fourier transform (FFT) to s[n] to generate frequency-domain training sequences S[n], and demodulating and decoding S[n] to generate the training bits. The training bits can be generated only once beforehand and stored.

At step 210, modulation and serial-to-parallel (S/P) conversion are performed by a modulator 211 and a S/P converter 212, respectively. Step 210 may involve, for example, mapping bits from the encoder to symbols according to the modulation method used, and performing the serial-to-parallel (S/P) conversion to generate a N×1 vector including N symbols S[n], n=0, 1, . . . , N−1.

At step 215, an N-point inverse fast Fourier transform (IFFT) is applied by an inverse Fourier transformer 216. Step 215 may involve, for example, applying an N-point inverse-FFT to the N×1 vector S[n] to generate N time-domain training symbols s[n], n=0, 1, . . . , N−1.

At step 220, a cyclic-prefix (CP) is inserted by a CP inserter 221, and parallel-to-serial (P/S) conversion is performed by a P/S converter 222. Step 220 may involve, for example, performing cyclic-prefix (CP) preamble copying from N/L trailing symbols of s[n] and performing the parallel-to-serial conversion (P/S).

At step 225, digital-to-analog conversion (DAC) is performed by a digital-to-analog converter 226 on the baseband digital signal to generate a baseband analog signal.

At step 230, up-conversion is performed by an up-converter 231. Step 230 may involve, for example, up-converting the baseband analog signal to a passband signal with the carrier frequency of the local oscillator (LO) at the transmitter as the center frequency.

At step 235, the channel 236 is utilized. Step 235 may involve, for example, passing the passband signal to be transmitted through the channel 236 to the receiver, and generating the received signal which is the convolution of the transmitted signal and the channel impulse response.

At step 240, down-conversion is performed by a down-converter 241. Step 240 may involve, for example, down-converting the received passband signal to the baseband signal, wherein the difference between the carrier frequency of the LO at the transmitter and that of the LO at the receiver introduces a carrier-frequency-offset.

At step 245, the time-domain received signal is digitized by performing analog-to-digital (ADC) conversion using an analog-to-digital converter 246.

At step 250, the cyclic prefix (CP) is removed by a CP remover 251. Step 250 may involve, for example, removing N/L CP preamble symbols from the digitalized received signal to generate N time-domain received symbols y[n], n=0, 1, . . . , N−1.

At step 255, the initial CFO estimate is obtained using L/2 correlations by an initial CFO estimator 256.

At step 260, a local search maximum likelihood (ML) estimation is performed by a maximum likelihood estimator 261. Step 260 may involve, for example, performing a local grid search based on the initial CFO estimate to obtain a local search ML estimate. By exploiting the special data structure of the projection matrix, the objective function to perform the grid search is simplified. L−1 correlations are needed to obtain the local search ML estimate.

At step 265, CFO correction is performed by a CFO corrector 266. Step 265 may involve, for example, compensating for the phase rotation induced by the CFO, once the CFO estimate is obtained.

At step 270, serial-to-parallel (S/P) conversion and N-point FFT are performed by a S/P converter 271 and a Fourier transformer 272, respectively. Step 270 may involve, for example, performing the S/P conversion and applying N-point FFT to the time-domain received symbols after the CFO correction to generate frequency domain received symbols.

At step 275, parallel-to-serial conversion (P/S) conversion and demodulation are performed by a P/S converter 276 and a demodulator 277. Step 275 may involve, for example, demodulating and decoding the received symbols after the P/S conversion.

It is to be appreciated that at least steps 255 and 260 essentially provide a new approach to estimating carrier frequency offset, according to an embodiment of the present principles. In further detail, the approach uses training symbols instead of a radio frequency (RF) tone or direct current (DC) components to estimate the CFO. Advantageously, high accuracy can be achieved with the present approach by performing the following two step estimation as essentially represented by steps 255 and 260, where step 255 roughly finds the CFO range and the step 260 accurately estimates the CFO within that range. Steps 255 and 260 are described in further detail herein below.

Figure 3:
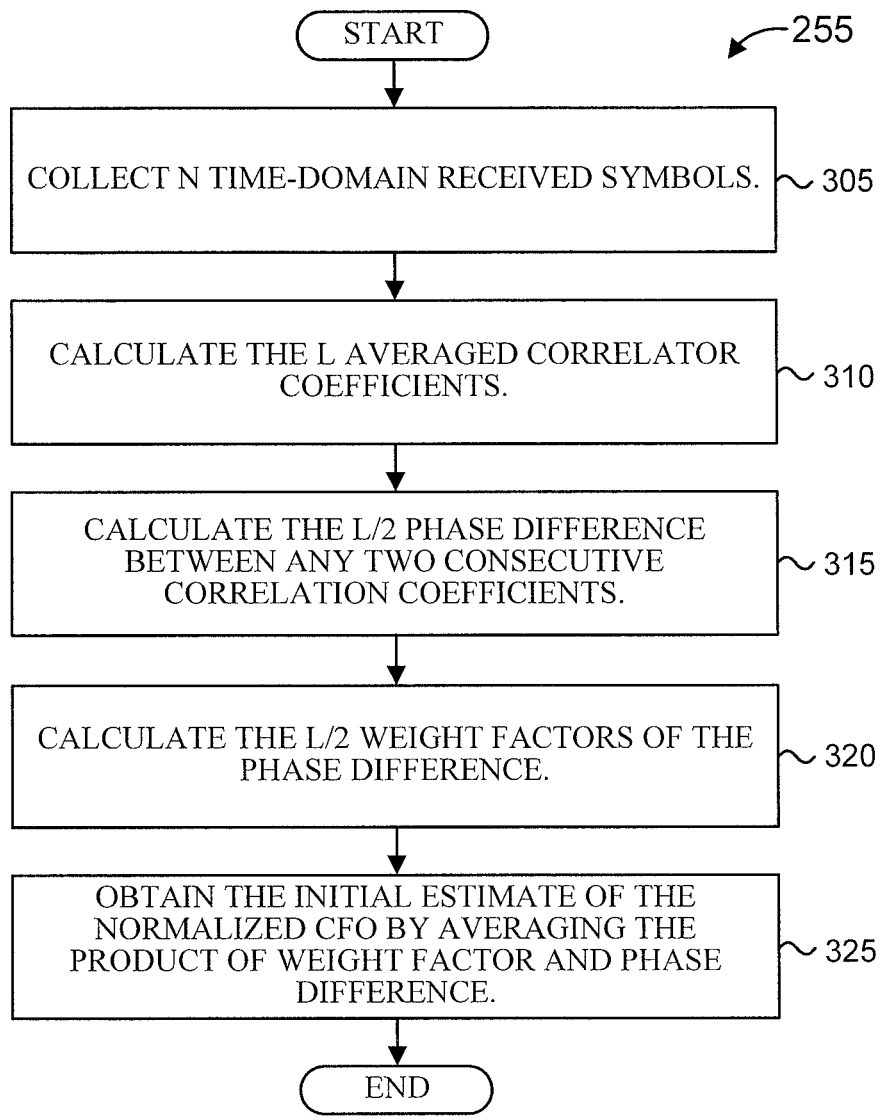
FIG. 3 is a flow diagram further showing step 255 (initial CFO estimation) of method 200 of FIG. 2, according to an embodiment of the present principles.

FIG. 3 is a flow diagram further showing step 255 (initial CFO estimation) of method 200 of FIG. 2, according to an embodiment of the present principles. At step 305, the N time-domain received symbols are collected as follows:

$$y[0], y\{*\}, \ldots, y[N-1].$$

At step 310, in order to fully exploit the information provided by the phase difference induced by CFO, the L averaged correlation coefficients are calculated according to the following equation:

$$p(l) = \sum_{n=lN/L}^{N-1} y[n]y^*[n-lN/L], \ l = 0, \ldots, L-1.$$

We can use, for example, the BLUE method (described below) to obtain the initial estimate at step 310 since no grid search and channel information are needed. In addition, $\{p(l)\}_{l=1}^{L/2}$ are used here as the trade-off between the performance and complexity since $\{p(l)\}_{l=L/2+1}^{L-1}$ is included the redundant information embedded in $\{p(l)\}_{l=1}^{L/2}$.

At step 315, the L/2 phase difference between any two consecutive correlation coefficients is calculated according to the following equation:

$$\phi(l) = \text{angle}\{p(l)p^*(l-1)\} l=1,2,\ldots,L-2$$

At step 320, the L/2 weight factors of the phase difference are calculated according to the following equation:

$$\omega(l) = 6\frac{(L-l)(L-l+1)-(L/2)^2}{L(L^2-1)}$$

$$l = 1, 2, \ldots, L-2$$

At step 325, the initial estimate of the normalized CFO is obtained by averaging the product of the weight factor and the phase difference as follows:

$$\hat{\varepsilon}_{ini} = \frac{L}{2\pi} \sum_{l=1}^{L/2} \omega(l)\varphi(l), \text{ where}$$

$$\omega(l) = 6\frac{(L-l)(L-l+1)-(L/2)^2}{L(L^2-1)} \text{ and}$$

$$\varphi(l) = \text{angle}\{p(l)p^*(l-1)\}.$$

We note that the BLUE method refers to the best linear unbiased estimate. For example, consider that we have received a data sequence x[0], x[1], ..., x[N−1], and the probability density function (PDF) p(x;θ) of the data sequence depends on an unknown parameter θ. Then, the BLUE method restricts the estimator to be linear in the data x, and the estimator of θ is determined as follows:

$$\hat{\theta} = \sum_{n=0}^{N-1} a_n x[n],$$

where the $\alpha'_n$s are the constants to be determined. The BLUE method is defined to be unbiased and have minimum variance. The unbiased estimator is as follows:

$$E(\hat{\theta})=\theta. \quad (1)$$

Thus, the constants $\alpha'_n$s have to meet Equation (1), and minimize the variance var($\hat{\theta}$).

The maximum likelihood (ML) estimator is an estimate of θ to maximize the conditional PDF p (x|θ). In our proposed method, we use BLUE to get the initial estimate of θ, then search the vicinity of the initial estimate of θ to search the ML estimate of θ which maximize the conditional PDF p(x|θ).

Figure 4:
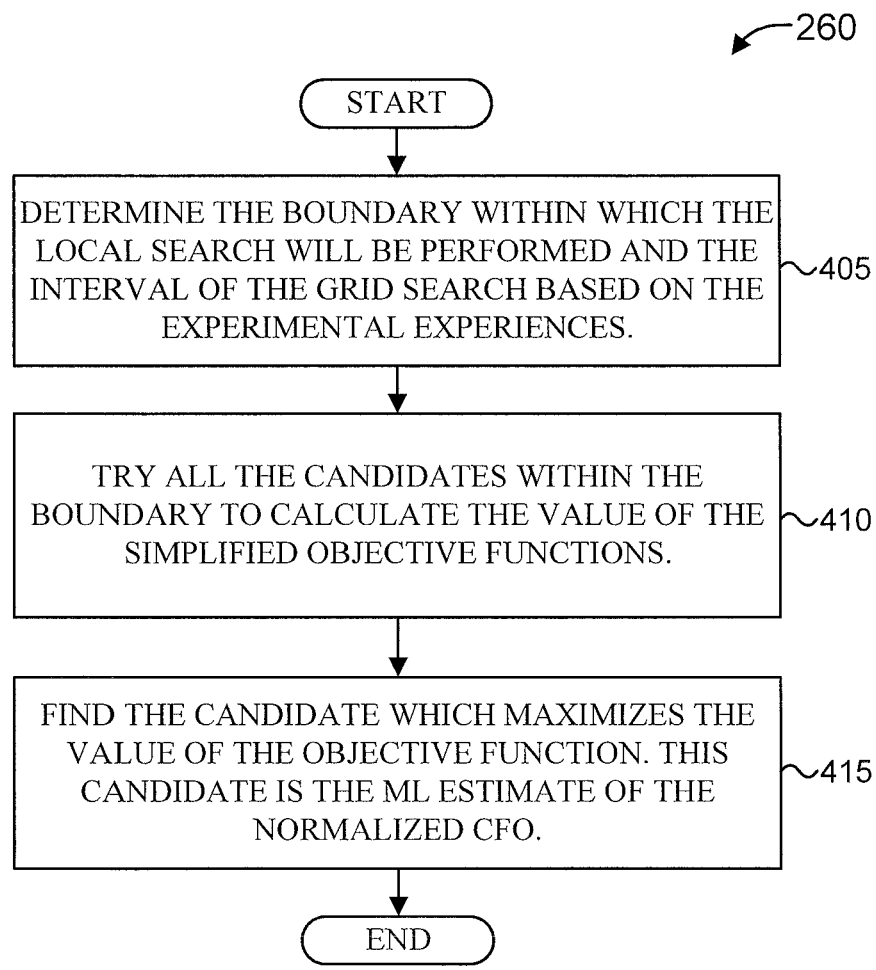
FIG. 4 is a flow diagram further showing step 260 (local search ML estimation) of method 200 of FIG. 2, according to an embodiment of the present principles.

FIG. 4 is a flow diagram further showing step 260 (local search ML estimation) of method 200 of FIG. 2, according to an embodiment of the present principles. At step 405, the boundary within which the local search will be performed and the interval of the grid search are determined (e.g., based on the experimental experiences). At step 410, all the candidates within the boundary are tried in order to calculate the value of the simplified objective functions as follows:

$$J(\varepsilon) = \Re\left\{\sum_{l=1}^{L-1} p(l)e^{-j2\pi\,\varepsilon l/L}\right\}.$$

At step 415, the candidate which maximizes the value of the objective function is found. This candidate is the ML estimate of the normalized CFO.

Thus, to estimate the CFO in a CO-OFDM system, there is always a trade-off between the complexity and estimation accuracy. The proposed method combines two estimation algorithms and provides accurate CFO estimation without increasing the computing complexity. Based on the initial estimate, the proposed approach can provide a reliable estimate, with a mean square error (MSE) very close to the Cramér-Rao bound (CRB). Thus, the approach can be advantageously employed for the estimation of CFO in CO-OFDM broadband systems when low-complexity and high-accuracy are required.

Figure 5:
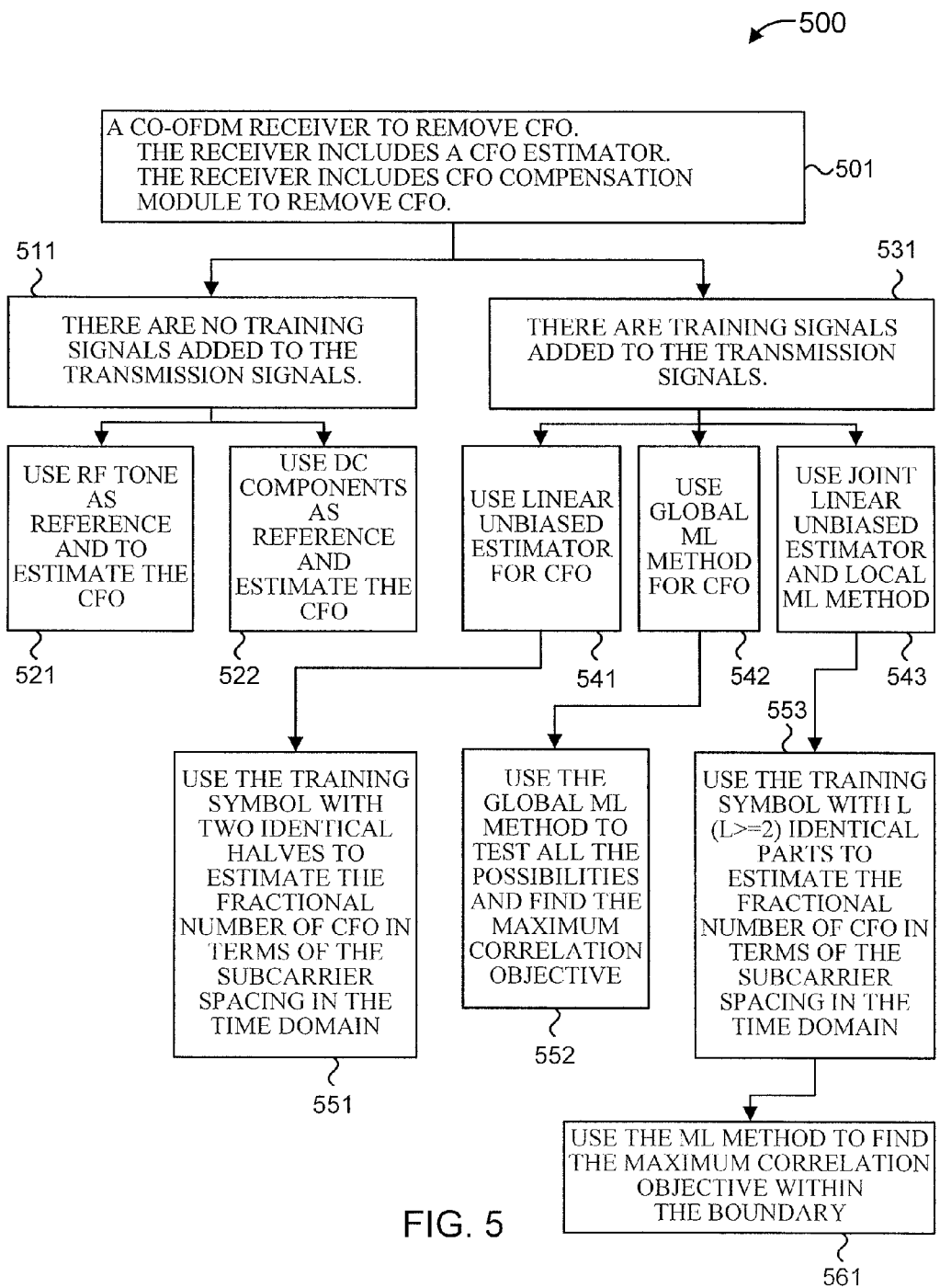
FIG. 5 is a flow diagram showing an exemplary method 500 for carrier frequency offset (CFO) estimation for coherent optical orthogonal-frequency-division-multiplexing (CO-OFDM) systems, according to an embodiment of the present principles.

FIG. 5 is a flow diagram showing an exemplary method 500 for carrier frequency offset (CFO) estimation for coherent optical orthogonal-frequency-division-multiplexing (CO-OFDM) systems, according to an embodiment of the present principles. At step 501, a CO-OFDM receiver is initialized to remove CFO. The receiver includes a CFO estimator. The receiver also includes a CFO compensation module to remove CFO.

At step 511, there are no training signals added to the transmission signals. Alternatively, at step 531, there are training signals added to the transmission signals.

At step 521, a radio frequency tone is used as a reference and to estimate the CFO. At step 522, direct current (DC) components are used as a reference and to estimate the CFO.

At step 541, a linear unbiased estimator is used to estimate the CFO. At step 551, the training symbols with two identical halves are used to estimate the fractional number of the CFO in terms of the subcarrier spacing in the time domain.

At step 542, a global maximum likelihood (ML) method is used to estimate the CFO. At step 552, the global ML method tests all the possibilities and finds the maximum correlation objective.

At step 543, a joint linear unbiased estimator and local ML method are used to estimate the CFO. At step 553, the training symbol with L (L>=2) identical parts is used to estimate the fractional number of the CFO in terms of the subcarrier subspacing in the time domain. At step 561, the ML method is used within the boundary (local) to find the maximum correlation objective.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Thus, in accordance with the present principles, a two-stage carrier-frequency-offset (CFO) estimator for coherent optical orthogonal-frequency-division-multiplexing (CO-OFDM) broadband systems is provided. The first stage involves obtaining an initial estimate of the normalized CFO with the estimation range equal to ±L/2 subcarrier subspacing (where L denotes a number of identical portions of a single training symbol used to obtain the initial estimate), and the second stage involves obtaining the maximum likelihood (ML) estimate by a local grid search based on the initial estimate. The objective function is simplified due to the special structure of the projection matrix induced by the training symbol with L identical parts.

The present principles are particularly directed to applications where a very high accurate estimate of CFO with a range larger than several subcarrier subspacings should be used to correct the offset, such as in CO-OFDM systems. By introducing one training symbol with L identical parts, an initial estimate of CFO can be obtained based on the BLUE method. Then a local grid search is performed based on the initial estimate to obtain the ML estimate to improve the accuracy at the expense of controlled complexity.

Here, we use the following notations: $(\cdot)^*$, $(\cdot)^T$, and $(\cdot)^H$ denote the complex-conjugate, transpose, and complex-conjugate transpose, respectively; $\otimes$ denotes the Kronecker product; $j=\sqrt{-1},(\cdot)_K$ denotes mod-K; angle$\{\cdot\}$ denotes the angle in radians; and $\Re\{\cdot\}$ denotes the real part.

Signal and System Model

Let $s_m=[s_m[0]\ s_m[1]\ \ldots\ s_m[N-1]]^T$ denote the $m^{th}$ block of data to be transmitted over the channel $h=[h[0]\ h[1]\ \ldots\ h[L_h-1]]$ in the time domain. Here the sample time interval $T_s=1/f_s=1$ is used for simplicity. Assuming that the length of the cyclic-prefix (CP) $L_p$ is larger than the channel delay spread $L_h$, then after CP removal, the output vector corrupted by the CFO, the $\Delta f$ channel dispersion and the additive white Gaussian noise (AWGN) within the $m^{th}$ demodulation window becomes as follows:

$$y_m = \Phi(\epsilon)Hs_m e^{j2\pi\epsilon(N+L_p)(m-1)/N} + n_m, \quad (2)$$

where H is the circulant channel matrix with zero-padded channel, with $\tilde{h}=[h^T 0_{N-L_h}]^T$ being its first column, and $\Phi(\epsilon)=$ diag$\{[1\ e^{j2\pi\epsilon/N}\ \ldots\ e^{j2\pi\epsilon(N-1)/N}]\}$ indicating the phase rotation induced by the CFO. Note that $\epsilon=\Delta f/f_{sub}$ denotes the normalized CFO, and $L=N\ f_{sub}$ denotes the subcarrier subspacing.

The circulant matrix H can be diagonalized by the unitary discrete Fourier transform (DFT) matrix W as $H=W^H\Lambda W$, with $\Lambda=\sqrt{N}$diag$\{W\tilde{h}\}$ representing the frequency-domain channel response. After the DFT operation, the received vector in the frequency domain can be obtained as follows:

$$\vec{Y}_m = W\Phi(\epsilon)W^H\Lambda\vec{S}_m e^{j2\pi\epsilon(N+L_p)(m-1)/N} + \vec{N}_m,$$

where $\vec{Y}_m=Wy_m, \vec{S}_m=Ws_m$, and $\vec{N}_m=Wn_m$. (3)

In the absence of the CFO, i.e., $\epsilon=0$ and $\Phi(\epsilon)=I_N$, then Equation (3) becomes $\vec{Y}_m=\Lambda\vec{S}_m+\vec{N}_m$, since $WW^H=I_N$. Hence the transmitted symbols can be decoded separately in the frequency domain. However, the matrix $W\Phi(\epsilon)W^H$ is no longer identity due to $\Phi(\epsilon)$ induced by the CFO, resulting in the inter-carrier-interference (ICI).

Initial CFO Estimation

Regarding the initial CFO estimation, we refer back to step 255 of FIG. 2 and the method of FIG. 3, which initially describe the same. To simplify the applicable notation, we assume that the first block of data is studied, i.e., $m=1$, and then it is dropped thereafter. It can be proved that in the absence of noise, a time-domain transmitted data block s with L identical parts essentially results in a received data block y with L identical parts, except the phase difference induced by CFO.

To fully exploit the information provided by the phase difference induced by CFO, the L correlations can be calculated as follows:

$$p(l) = \sum_{n=1N/L}^{N-1} y[n]y^*[n-lN/L], l=0,\ldots,L-1.$$

We use the BLUE method to obtain the initial estimate since no grid search and channel information are needed. In addition, $\{p(l)\}_{l=1}^{L/2}$ are used here as the tradeoff between the performance and complexity since $\{p(l)\}_{l=L/2+1}^{L-1}$ includes the redundant information embedded in $\{p(l)\}_{l=1}^{L/2}$. Consequently, the initial estimate of CFO can be obtained as follows:

$$\hat{\epsilon}_{ini} = \frac{L}{2\pi}\sum_{l=1}^{L/2}\omega(l)\varphi(l), \text{ where} \quad (4)$$

$$\omega(l) = 6\frac{(L-l)(L-l+1)-(L/2)^2}{L(L^2-1)}, \text{ and}$$

$$\varphi(l) = \text{angle}\{p(l)p^*(l-1)\}.$$

Local Search ML Method

Regarding the local search ML method, we refer back to step 260 of FIG. 2 and the method of FIG. 4, which initially describe the same. Equation (2) from the signal and system model description above can be re-written as $y=\Phi(\epsilon)Sh+n$ where S is a $N\times L_h$ matrix with entries $S_{i,j}=s[(i-j)_N](1\le i\le N, 1\le j\le L_h)$. Assume $n\sim CN(0, \sigma_n^2 I_N)$, then the joint ML estimates of $\epsilon$ and h can be obtained as follows:

$$\{\hat{\epsilon}_{ML},\hat{h}_{ML}\}=\arg\min_{\epsilon,h}\|y-\Phi(\epsilon)Sh\|^2 \quad (5)$$

We set the derivative of the objective function to h to zero, and have $\hat{h}(\epsilon)=(S^HS)^{-1}S^H\Phi^H(\epsilon)y$. We substitute the preceding into Equation (5), and obtain the following:

$$\hat{\epsilon}_{ML}=\arg\max_\epsilon\{y^H\Phi(\epsilon)P\Phi^H(\epsilon)y\}, \quad (6)$$

where $P=S(S^HS)^{-1}S^H$ denotes the projection matrix. The projection matrix has a special data structure when the training data s has L identical parts. This structure can be exploited to simplify the objective function.

Without loss of generality, we choose $L_h=N/L$ for convenience. If the length of the channel is shorter than $N/L$, the estimated channel will have several zero taps. Under this condition, the data matrix S can be partitioned into L identical sub-matrices as $S=[\underline{s},\ldots,\underline{s}]^T$, where $\underline{s}$ is a $N/L\times N/L$ circulant matrix with entries $\underline{s}_{i,j}=s[(i-j)_{N/L}](1\le i,j\le N/L)$. As a result, the projection matrix P becomes $P=1/L 1_L\otimes I_{N/L}$ where $1_L$ denotes a $L\times L$ square matrix with entries being all ones. Use this property, the estimator in Equation (6) becomes the following:

$$\hat{\epsilon}_{ML} = \text{argmax}_\epsilon\left\{-p(0)+2\Re\left\{\sum_{l=1}^{L-1}p(l)e^{-j2\pi\epsilon l/L}\right\}\right\}, \quad (7)$$

However, the grid search over the entire range of possible CFO is needed to obtain $\hat{\epsilon}_{ML}$ according to Equation (7). This is unfeasible in high-rate optical transmission systems. Based on the initial estimate of CFO $\hat{\epsilon}_{ini}$, the ML estimate of CFO can be obtained by only searching the vicinity of $\hat{\epsilon}_{ini}$. Removing the parts without $\epsilon$, we have the following:

$$\hat{\epsilon}_{ML} = \text{argmax}_{|\epsilon-\hat{\epsilon}_{ini}|\le\epsilon_b}\left\{\Re\left\{\sum_{l=1}^{L-1}p(l)e^{-j2\pi\epsilon l/L}\right\}\right\} \quad (8)$$

where $\epsilon_b$ is a parameter to be designed empirically.

Let SNR$=\sigma_s^2/\sigma_n^2$ with $$\sigma_s^2 = \frac{1}{N}s^H s.$$

The variance of the ML estimate in Equation (7) is as follows:

$$\text{var}\{\hat{\epsilon}_{ML}\} = \frac{3(SNR)^{-1}}{2\pi^2 N(1-(1/L)^2)} \quad (9)$$

It is also the Cramér-Rao bound (CRB). The CRB decreases with the increase of L. Note although the variance of $\hat{\epsilon}_{ini}$ is approximately the same as (8)[5], the performance improvement is obvious by employing ML method based on the initial estimate obtained by the BLUE method. Let vâr$\{\hat{\epsilon}_{ini}\}$ denote the variance obtained based on simulations, and the boundary $\epsilon_b$ can be designed to be $\epsilon_b = \sqrt{\text{vâr}\{\hat{\epsilon}_{ini}\}} - \sqrt{\text{var}\{\hat{\epsilon}_{ML}\}}$.

Thus, each grid search needs 2(L−1) complex products and L−1 additions, respectively, excluding the operations of exp{·} and max{·}. The number of grid searches performed is determined by $\epsilon_b$ and the grid interval $\Delta\epsilon$. Consequently, compared to the full-range grid search, $2((L-2\epsilon_b)/\Delta\epsilon)(L-1)$ complex products and $((L-2\epsilon_b)/\Delta\epsilon)(L-1)$ complex additions are reduced. We note that performing the operation max{·} within a smaller set reduces the complexity as well. The high-accuracy and low-complexity of the proposed CFO estimator make it applicable to high-rate CO-OFDM broadband systems.

Thus, according to the present principles, a local search ML approach to estimate carrier frequency offset is provided. Based on the initial estimate, the proposed approach can provide a reliable estimate, with a means square error very close to the Cramer-Rao bound. The approach is a good candidate for the estimation of carrier frequency offset in CO-OFDM broadband systems when low-complexity and high-accuracy are required.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for carrier frequency offset (CFO) estimation for coherent optical orthogonal-frequency-division-multiplexing (CO-OFDM) broadband systems, comprising:

obtaining an initial estimate of a normalized CFO with an estimation range equal to ±L/2 subcarrier subspacing using a single training symbol with L identical portions;
storing the initial estimate in a memory device; and
obtaining a maximum likelihood (ML) estimate of the CFO by performing a local grid search based on the initial estimate,
wherein the ML estimate is calculated by maximizing over a set of grid search results that fall within a range around the initial estimate defined by an empirically designed parameter, and
wherein the ML estimate is calculated as:

$$\epsilon_{ML} = \text{argmax}_{|\epsilon - \hat{\epsilon}_{ini}| \le \epsilon_b} \left\{ \Re\left(\sum_{l=1}^{L-1} p(l)e^{-j2\pi\epsilon l/L}\right) \right\},$$

where $\epsilon$ is a normalized CFO, $\hat{\epsilon}_{ini}$ is an initial CFO estimate $\epsilon_b$ is an empirically designed parameter, and p(l) provides correlations.

2. The method of claim 1, wherein the initial estimate is obtained without considering channel information and without a grid search.

3. The method of claim 1, wherein the initial estimate is obtained by:
calculating averaged correlation coefficients between time-domain received symbols;
calculating a phase difference between any two consecutive ones of the averaged correlation coefficients;
calculating a weight factor of the phase difference; and
averaging a product of the weight factor and the phase difference.

4. The method of claim 1, wherein the local grid search is limited to searching only within a pre-specified vicinity of the initial estimate.

5. The method of claim 1, wherein the local grid search comprises a plurality of grid searches, and a number of the plurality of grid searches performed to obtain the ML estimate is determined by the empirically designed parameter and a grid interval.

6. The method of claim 1, wherein the ML estimate is obtained by jointly estimating the CFO and an objective function, the objective function for performing the grid search to identify a plurality of candidate ML estimates.

7. The method of claim 6, wherein the ML estimate is obtained by selecting a corresponding one of the plurality of candidate ML estimates that maximizes a value of the objective function.

8. The method of claim 6, wherein a projection matrix is derived from the single training symbol with the L identical portions, the projection matrix having a structure that is exploited to reduce a number of correlations used by the objective function to perform the grid search.

9. The method of claim 1, wherein the initial estimate and the ML estimate are both obtained without using a radio frequency tone and direct current components as a CFO estimation reference.

10. A system for carrier-frequency-offset (CFO) estimation for coherent optical orthogonal-frequency-division-multiplexing (CO-OFDM) broadband systems, comprising:
an initial carrier frequency offset estimator for obtaining an initial estimate of a normalized CFO with an estimation range equal to ±L/2 subcarrier subspacing using a single training symbol with L identical portions;
a memory for storing the initial estimate; and a maximum likelihood estimator for obtaining a maximum likelihood (ML) estimate of the CFO by performing a local grid search based on the initial estimate, wherein the ML estimate is calculated by maximizing over a set of grid search results that fall within a range around the initial estimate defined by an empirically designed parameter, and wherein the ML estimate is calculated as:

$$\epsilon_{ML} = \mathrm{argmax}_{|\epsilon-\hat{\epsilon}_{ini}|\le\epsilon_b} \left\{ \Re\left(\sum_{l=1}^{L-1} p(l)e^{-j2\pi\epsilon l/L}\right) \right\},$$

where $\epsilon$ is a normalized CFO, $\hat{\epsilon}_{ini}$ is an initial CFO estimate $\epsilon_b$ is an empirically designed parameter, and p(l) provides correlations.

11. The system of claim 10, wherein the initial estimate is obtained without considering channel information and without a grid search.

12. The system of claim 10, wherein the initial estimate is obtained by calculating averaged correlation coefficients between time-domain received symbols, calculating a phase difference between any two consecutive ones of the averaged correlation coefficients, calculating a weight factor of the phase difference, and averaging a product of the weight factor and the phase difference.

13. The system of claim 10, wherein the local grid search is limited to searching only within a pre-specified vicinity of the initial estimate.

14. The system of claim 10, wherein the local grid search comprises a plurality of grid searches, and a number of the plurality of grid searches performed to obtain the ML estimate is determined by the empirically designed parameter and a grid interval.

15. The system of claim 10, wherein the ML estimate is obtained by jointly estimating the CFO and an objective function, the objective function for performing the grid search to identify a plurality of candidate ML estimates.

16. The system of claim 15, wherein the ML estimate is obtained by selecting a corresponding one of the plurality of candidate ML estimates that maximizes a value of the objective function.

17. The system of claim 15, wherein a projection matrix is derived from the single training symbol with the L identical portions, the projection matrix having a structure that is exploited to reduce a number of correlations used by the objective function to perform the grid search.

18. The system of claim 10, wherein the initial estimate and the ML estimate are both obtained without using a radio frequency tone and direct current components as a CFO estimation reference.

* * * * *